Aug. 16, 1932.  J. C. McCUNE  1,872,481
SAFETY CAR CONTROL EQUIPMENT
Filed July 6, 1931
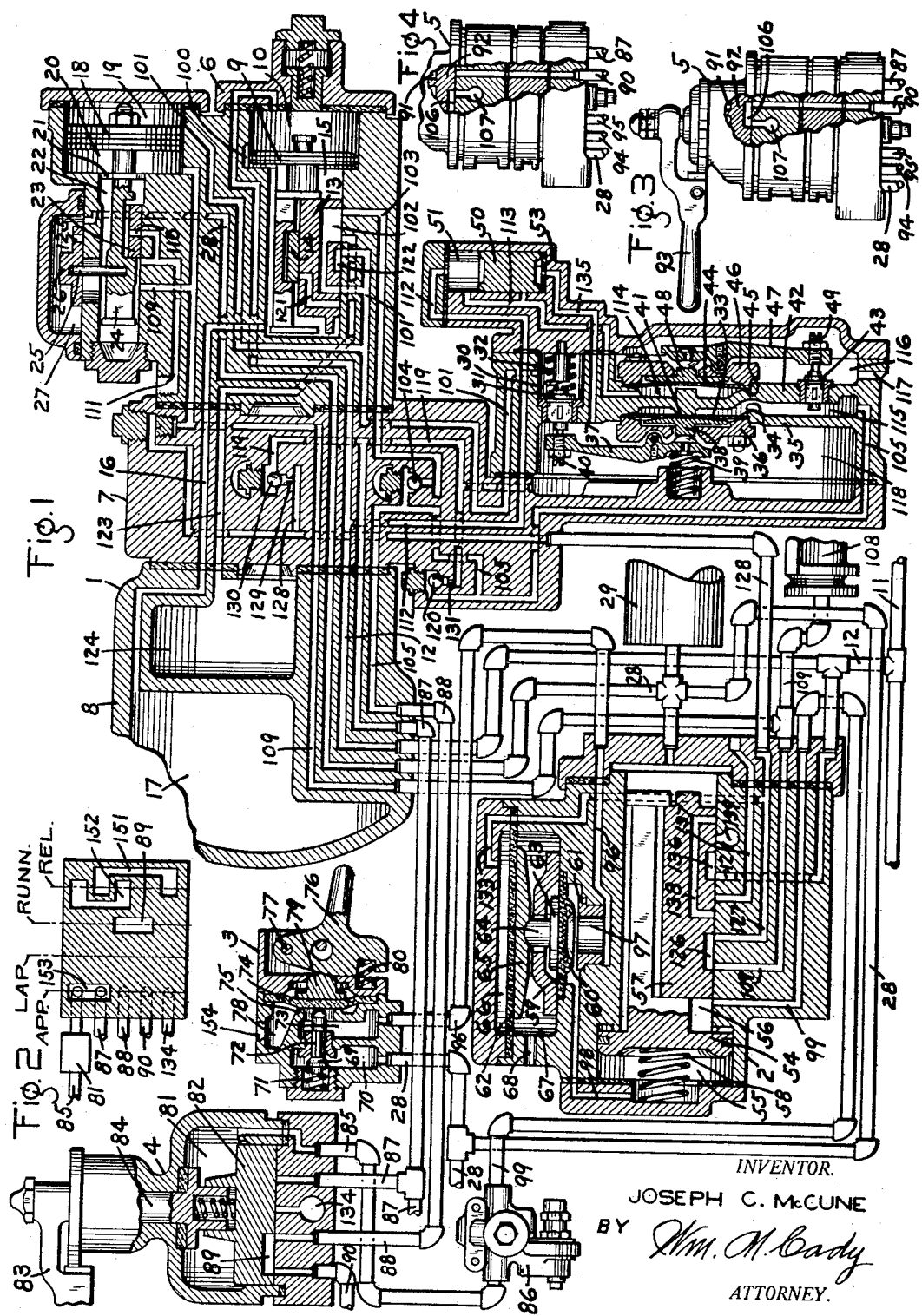
INVENTOR.
JOSEPH C. McCUNE
BY Wm. M. Cady
ATTORNEY.

Patented Aug. 16, 1932

1,872,481

UNITED STATES PATENT OFFICE

JOSEPH C. McCUNE, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

SAFETY CAR CONTROL EQUIPMENT

Application filed July 6, 1931. Serial No. 548,842.

This invention relates to fluid pressure brakes, and more particularly to the type employing a distributing valve device such as is used on a locomotive for controlling the locomotive brakes.

The usual distributing valve device such as employed in the well known E T locomotive brake equipment is adapted to operate in accordance with variations in brake pipe pressure to control the locomotive brakes, and its operation is also controlled by an independent brake valve device independently of variations in brake pipe pressure.

The distributing valve device is provided with an application pipe through which the locomotive brakes are adapted to be applied and released by operation of the independent brake valve device, and a release pipe through which the locomotive brakes are adapted to be released upon an increase in brake pipe pressure.

If the application pipe should become broken, an application of the brakes is impossible either by reducing brake pipe pressure or by operation of the independent brake valve device. If the release pipe should become broken, it does not interfere with an application of brakes effected by reducing brake pipe pressure, but with the equalizing portion of the distributing valve device in release position, an application of the brakes by operation of the independent brake valve device is prevented.

The usual distributing valve device is provided with an application piston chamber to which fluid under pressure is supplied in effecting an application of the brakes. The application pipe is connected to the application piston chamber so that fluid under pressure supplied to said chamber equalizes into the application pipe.

The application pipe usually extends from one end of a locomotive to the other end and thus varies in length and volume in accordance with the length of the locomotive. Consequently, the pressure obtained in the application piston chamber upon a reduction in brake pipe pressure depends upon and varies with the amount of application pipe volume which is added to said chamber. This is undesirable in that the pressure obtained in the application piston chamber and consequently in the brake cylinder can not be definitely fixed and if the pressure is satisfactory for a short locomotive, it will be lower on a long locomotive and may not provide the proper degree of retardation.

Means have heretofore been provided as disclosed in my pending application, Serial No. 373,169, filed June 24, 1929, whereby the application cylinder pipe is cut off from the application piston chamber when an application of the brakes is effected by a reduction in brake pipe pressure, so that fluid under pressure supplied to the application piston chamber does not equalize into the application pipe, and the same means are also adapted to prevent the loss of locomotive brakes upon breakage of the application pipe. However, after an emergency application of the brakes is effected, the locomotive brakes can not be released independently of the train brakes by operating the independent brake valve device.

One object of my invention is to provide improved means for preventing equalization of pressure supplied to the application piston chamber into the application pipe and for ensuring that the brakes will be applied on the locomotive in case the application pipe should become broken.

Another object of my invention is to provide means by which the brakes on the locomotive may be released independently of the brakes on the train after an emergency application.

Another object of my invention is to provide means on the locomotive for effecting an emergency application of the brakes should the engineer become incapacitated.

Another object of my invention is to provide safety means associated with the brake apparatus on the locomotive adapted to effect an emergency application if the engineer should become incapacitated and means for preventing the release of the brakes unless the safety means is restored to its normal or running position.

Other objects and advantages will appear in the following more detailed description of my invention.

In the accompanying drawing; Fig. 1 is a diagrammatic view, mainly in section, of a fluid pressure brake equipment embodying my invention; Fig. 2 is a development view showing diagrammatically the connections established in various positions of the rotary valve of the independent brake valve device shown in Fig. 1; Fig. 3 is an elevation of an automatic brake valve device for use in connection with the brake equipment shown in Fig. 1 and having a portion broken away to show a connection established through the rotary valve in the usual running position; and Fig. 4 is a view similar to that of Fig. 3 but showing the rotary valve of the automatic brake valve device in a different position.

As shown in the drawing, the fluid pressure brake equipment comprises a distributing valve device 1, an application valve device 2, a foot valve device 3, an independent brake valve device 4, and an automatic brake valve device 5.

The distributing valve device 1 comprises the usual valve portion 6 mounted on one face of a filler portion 7, and a reservoir portion 8 mounted on another face of the filler portion 7.

The valve portion of the distributing valve device comprises an equalizing piston 9 having at one side a chamber 10 open to the brake pipe 11 through a passage and pipe 12 and having a valve chamber 15 at the opposite side connected through passage 16 with the usual pressure chamber 17 and containing a main slide valve 13 and an auxiliary slide valve 14 adapted to be operated by said piston.

The valve portion of the distributing valve device further comprises an application piston 18 having a chamber 19 at one side and a chamber 20 at the other side. The piston 18 is provided with a stem 24 upon which is mounted a baffle piston 21 separating chamber 20 from a valve chamber 22 containing a release slide valve 23 adapted to be operated by the piston 18.

The piston stem 24 is provided with a pin 25 adapted to operate an application slide valve 26 upon movement of the application piston 18. The application slide valve 26 is contained in a chamber 27 which is connected to a passage 28 leading to a main reservoir 29.

The filler portion 7 of the distributing valve device comprises a casing having a chamber 30 containing a cut-off valve 31 and a spring 32 for urging said valve into engagement with its seat. The casing is provided with a partition wall 35 having an annular seat 34 between which and a clamping ring 36 is mounted a flexible diaphragm 33 for controlling the operation of the cut-off valve 31. For transmitting the deflection of diaphragm 33 to the valve 31, a lever 37 is provided. Said lever is pivotally mounted on the ring 36 and one end is pressed into engagement with a follower 38, which engages the diaphragm 33, by means of a spring 39. The other end of the lever 37 is provided with an adjusting screw 40 engaging the stem of the cut-off valve 31 for operating said valve. A stop lug 41 is provided on a partition wall 42 for normally limiting the deflection of the diaphragm 33 by the spring 39.

Mounted in the partition wall 42 of the casing is another valve 43 which is adapted to be pressed into engagement with its seat by the deflection of a flexible diaphragm 44 which is mounted between an annular seat 45 of the partition wall 42 and a clamping ring 46. A lever 47 is provided for transmitting deflection of the diaphragm 44 to the valve 43 and is pivotally mounted on the ring 46. One end of the lever 47 engages a follower 48 of the diaphragm 44 and the other end of said lever is provided with an adjusting screw 49 for operating the valve 43.

Associated with the filler portion 7 is a double check valve device comprising a double check valve 50 having at one side a chamber 51 open through passage 112 and passage and pipe 12 to the brake pipe 11 and having at the opposite side a chamber 53.

The application valve device 2 comprises a piston 54 having at one side a chamber 55 and at the opposite side a chamber 56 open through passage and pipe 28 to the main reservoir 29. A slide valve 57 is contained in the chamber 56 and is adapted to be operated by the piston 54. A spring 58 is provided in chamber 55 for urging the piston 54 and slide valve 57 to the normal position shown in the drawing.

Associated with the application valve device 2 is a safety control cut-off valve device comprising a flexible diaphragm 59 having a valve seat rib 60 adapted to engage and seal on a rib 61 in the casing, and a flexible diaphragm 62 for deflecting the valve diaphragm 59. Said diaphragms are operatively connected through the medium of a follower plate 63 carried by the diaphragm 59 and having a stem 64 adapted to engage a follower plate 65, which in turn, engages the diaphragm 62. A chamber 66 is formed at one side of the diaphragm 62, and a chamber 67 is formed between the diaphragms 59 and 62 and is open to the atmosphere through a passage 68.

The foot valve device 3 comprises a casing having a chamber 70 containing a valve 69 which is urged to its seat by a spring 71. For unseating the valve 69, a flexible diaphragm 74 is mounted in the casing and engages the fluted stem 72 of valve 69, said stem extending through a partition wall and into chamber 73. In unseating valve 69, the diaphragm 74 is deflected into engagement with a seat rib 75 for closing communication between chamber 73 and an atmospheric chamber 78. A foot pedal 76 is provided for deflecting the diaphragm 74 through the medium of a diaphragm follower member 79, said foot pedal being pivotally carried by a pin 77 in the casing. A spring 80 is provided between the casing and the foot pedal 76 for urging the pedal away from the diaphragm follower 79 upon the relief of manual pressure on the pedal 76.

The independent brake valve device 4 is of the usual type comprising a casing having a chamber 81 containing a rotary valve 82 adapted to be turned by a handle 83 through the medium of a shaft 84. The independent brake valve device is connected to pipe 85 leading to a reducing valve device 86 which may be of any desired construction, and is also connected to the usual application cylinder pipe 87 and distributing valve release pipe 88 in the well known manner. The distributing valve release pipe 88 is connected through a cavity 89 in the rotary valve 82 to a pipe 90 leading to the automatic brake valve device 5, which is shown in Figs. 3 and 4.

The automatic brake valve device 5 is of the usual construction comprising a casing having a valve chamber 91 containing a rotary valve 92 adapted to be turned by a handle 93. The brake valve casing is broken away to show the manner in which the distributing valve release pipe 90 from the independent brake valve device 4 is controlled by the rotary valve 92. The automatic brake valve device is also connected to the application pipe 87, the main reservoir pipe 28, a pipe 94 leading to the usual feed valve device (not shown), and through a pipe 95 to the brake pipe 11, so that the pressure fluid in the brake pipe may be varied in the usual manner.

The above description of the automatic brake valve device is limited to such details as are deemed necessary to a clear understanding of the invention, a complete illustration and description being deemed unnecessary, since the automatic brake valve device is a well known part of the usual locomotive brake equipment.

In operation, fluid under pressure is supplied to the main reservoir 29 in the usual manner and flows therefrom through pipe and passage 28 to the application valve chamber 27 of the distributing valve device 1, to valve chamber 56 of the application valve device 2, and to valve chamber 70 of the foot valve device 3.

The foot valve device 3 is a safety device adapted to operate upon incapacitation or inattentiveness of the operator, and the pedal 76 is normally maintained depressed by the foot of the engineer. This deflects diaphragm 74 into engagement with seat rib 75 and unseats valve 69. Fluid at main reservoir pressure then flows from chamber 70 to chamber 73 and from thence through passage and pipe 96 to chamber 97 below the cut-off valve diaphragm 59. The diaphragm valve 60 is normally unseated from rib 61 so that fluid flows from chamber 97 through passage 98 to the application valve piston chamber 55. The fluid pressures are thus balanced on the opposite sides of the application piston 54 and spring 58 maintains said piston and the slide valve 57 in the position shown in the drawing. In this position of slide valve 57, fluid at main reservoir pressure flows from chamber 56 through passage and pipe 99 to the reducing valve device 86, which then operates in the usual manner to supply fluid at a reduced pressure to pipe 85 leading to chamber 81 in the independent brake valve device 4.

Fluid under pressure is supplied to the brake pipe 11 by operation of the automatic brake valve device 5 in the usual manner. From the brake pipe 11, fluid under pressure flows through pipe and passage 12 to the equalizing piston chamber 10 of the distributing valve device 1. With the equalizing piston 9 in the release position shown in the drawing, fluid under pressure flows from chamber 10 through a feed groove 100 to valve chamber 15 and from thence through passage 16 to the pressure chamber 17, thereby charging said chambers.

With the equalizing slide valve 13 in release position, the application piston chamber 19 is open to the atmosphere through passage 101, cavity 102 in said slide valve, passage 103, past the check valve 104, through passage 105, distributing valve release pipe and passage 88, cavity 89 in rotary valve 82 of the independent brake valve device 4, passage and pipe 90, cavity 106 in the rotary valve 92 of the automatic brake valve device 5 and atmospheric passage 107.

With the application piston chamber 19 at atmospheric pressure, the usual brake cylinder 108 is opened to the atmosphere through pipe and passage 109, release valve chamber 22 of the distributing valve device 1, port 110 in the release slide valve 23 and atmospheric passage 111.

Fluid at brake pipe pressure flows from the brake pipe passage 12 in the distributing valve device through passage 112 to chamber 51 of the double check valve device and from thence through passage 113 to diaphragm chamber 114. The diaphragm 44 is thereby deflected to seat valve 43 so as to cut off communication from chamber 115 to chamber 116, the chamber 116 being at all times open to the atmosphere through a passage 117.

Chamber 115 is open through passage 105 to the distributing valve release pipe 88, which is normally vented as hereinbefore described. Chamber 118 at the opposite side of diaphragm 33 is also open to the atmosphere through the application pipe passage 119, past the check valve 120 and through the distributing valve release passage 105 and pipe 88. This permits spring 39 to hold the diaphragm 33 in engagement with the stop 41 and in turn permits spring 32 to seat the cut-off valve 31.

If it is desired to effect an automatic service application of the brakes, the pressure of fluid in the brake pipe 11 is gradually reduced by operation of the brake valve device 5 in the usual, well known manner. The equalizing piston chamber 10 of the distributing valve device 1 being connected to the brake pipe 11 through passage and pipe 12, the pressure of fluid in said chamber reduces and permits the pressure of fluid in the equalizing valve chamber 15 to shift the piston 9 and slide valves 13 and 14 to service position.

In service position of the slide valves 13 and 14, a service port 121 through the slide valve 13 is uncovered by slide valve 14, and said service port registers with passage 101 in the seat of slide valve 13. This permits fluid under pressure to flow from the equalizing valve chamber 15 and the connected pressure chamber 17 to passage 101 and from thence to the application piston chamber 19 and also from passage 101 through cavity 122 in the slide valve 13 to passage 123 leading to an application chamber 124.

The pressure of fluid thus supplied to the application piston chamber 19 shifts the application piston 18 toward the left hand. In moving toward the left, the piston 18 shifts the release slide valve 23 so as to lap the brake cylinder exhaust passage 111, and further movement brings a port 125 in the application slide valve 26 into registry with chamber 22. This permits fluid under pressure supplied from the main reservoir 29 to chamber 27 to flow through port 125 to valve chamber 22 and from thence through passage and pipe 109 to the brake cylinder 108 to apply the brakes.

Fluid under pressure supplied to passage 101 leading to the application piston chamber 19 and connected with the application chamber 124 also flows to the cut off valve chamber 30 and since the cut-off valve 31 is normally seated, fluid under pressure equalizes in chamber 30. The cut-off valve 30 thus prevents equalization of fluid under pressure from the application piston chamber 19 and application chamber 124 into passage 119 and the application cylinder pipe 87, which would cause an undesirable reduction in the pressure obtained in the application piston chamber 19 and consequently in the brake cylinder. The length of the application cylinder pipe 87 varies according to the length of the locomotive and if the application cylinder pipe cut-off valve 31 were not employed, the pressure that would be obtained in the application piston chamber for a certain degree of brake pipe reduction would vary as the volume of the application cylinder pipe 87. The cut-off valve 31 prevents such variation in pressure in the application piston chamber 19 by fixing the volume to which fluid is supplied by the equalizing valve device.

The application cylinder pipe 87 is lapped by the rotary valve 82 of the independent brake valve device 4 when said rotary valve is in the running position, as shown in Fig. 1, in which position, it is normally carried when the brakes are applied upon a reduction in brake pipe pressure. The application cylinder pipe 87 is also lapped in the automatic brake valve device in all positions except the usual emergency position. Also, the usual distributing valve release pipe 88 is connected through rotary valve 82 of the independent brake valve device 4 to pipe 90, which is lapped by rotary valve 92 of the automatic brake valve device 5, as shown in Fig. 4 of the drawing, when said brake valve device is moved out of the usual running position shown in Fig. 3 of the drawing.

Fluid under pressure supplied through pipe 109 to the brake cylinder 108 in the manner hereinbefore described flows from said pipe through cavity 126 in the application slide valve 57 to passage 127 and from thence through pipe and passage 128 and a choke 129 to the lower side of a check valve 130, thence past said check valve and through passage 119 to chamber 118 in which the pressure acts on one side of the cut-off valve diaphragm 33. At the same time, fluid under pressure flows from passage 119 through a choke 131, past check valve 120 to passage 105 leading to chamber 115 on the other side of the diaphragm 33. The diaphragm 33 is thus subject on its opposite sides to fluid at the same pressure, which permits spring 39 to maintain lever 37 in the position shown in the drawing, in which the cut-off valve 31 remains seated.

The release pipe 88 being connected to passage 105 to which fluid under pressure is supplied from passage 119 becomes charged with fluid under pressure from the brake cylinder, so that when it is desired to hold the locomotive brakes applied in releasing the train brakes, fluid under pressure will not flow from the application piston chamber 19 into the release pipe 88 and thus effect a partial undesired release of the locomotive brakes, as will be hereinafter fully described. The application pipe 87 is also charged with fluid under pressure from passage 119 which is supplied with fluid under pressure from the brake cylinder. As hereinbefore described, release pipe pressure acts in chamber 115 on diaphragm 33 and tends to unseat the cut-off valve 31, but by supplying fluid under pressure through passage 119 to chamber 118 on the opposite side of said diaphragm, and consequently from passage 119 to the application pipe 87, the diaphragm 33 is placed in equilibrium, so that the cut-off valve 31 remains seated.

When the pressure of fluid supplied to valve chamber 22 of the distributing valve device 1 and consequently to brake cylinder 108 and through passage 109 to application piston chamber 20 builds up to a degree slightly exceeding the pressure of fluid supplied to chamber 19, the application piston 18 is shifted toward the right hand. This movement of piston 18 shifts the application slide valve 26 until port 125 is lapped, so as to prevent further flow of fluid to the brake cylinder. The pressure of fluid thus obtained in the brake cylinder is substantially equal to the pressure of fluid obtained in chamber 19, and as a result the pressure of fluid obtained in the application pipe 87 and distributing valve release pipe 88 is substantially equal to the pressure obtained in the application piston chamber 19, application chamber 124 and cut-off valve chamber 30, since both of said pipes are charged with fluid under pressure from the brake cylinder in the manner hereinbefore described.

To effect a release of the brakes after an automatic service application, the brake valve device 5 is operated to supply fluid under pressure to the brake pipe. The consequent increase in pressure in the equalizing piston chamber 10 shifts the equalizing piston 9 and slide valves 13 and 14 to the release position in which fluid under pressure flows from piston chamber 10 through feed groove 100 to valve chamber 15 and from thence through passage 16 to the pressure chamber 17, thereby charging said chambers.

With the automatic brake valve device 5 in the running position shown in Fig. 3 and with the equalizing slide valves 13 and 14 in the release position shown in Fig. 1, fluid under pressure is vented from the application piston chamber 19 to the atmosphere through passage 101, cavity 102 in slide valve 13, passage 103, past the check valve 104, through passage 105, the distributing valve release pipe 88, cavity 89 in the rotary valve 82 of the independent brake valve device, pipe and passage 90, cavity 106 in rotary valve 92 of the automatic brake valve device 5, and atmospheric passage 107. The application chamber 124 being connected through passage 123 to cavity 102 in slide valve 13, through which cavity fluid under pressure is vented from the application piston chamber 19, the chamber 124 is also vented. Fluid under pressure is also vented from the application pipe 87 through passage 119, choke 131, past the check valve 120 and through passage 105 leading to the vented release pipe 88. The supply of fluid under pressure from the brake cylinder 108 through passage 128 to passage 119 connecting to the application cylinder pipe 87 being restricted by choke 129 permits the application pipe 87 and release pipe 88 to be vented in the manner above described.

The venting of fluid under pressure from the application piston chamber 19 permits brake cylinder pressure in chamber 20 to shift the piston 18 and slide valves 23 and 25 to release position in which fluid under pressure is vented from the brake cylinder 108 through pipe and passage 109, release valve chamber 22, port 110 in the release slide valve 23 and atmospheric passage 111, thereby effecting a release of the brakes.

In effecting a release of the brakes after an automatic application, it is customary to first move the automatic brake valve device to release position for supplying fluid at high pressure directly from the main reservoir to the brake pipe 11, and then after a certain lapse of time, the brake valve device is moved to running position for completing the charging of the brake pipe. In release position of the automatic brake valve device 5, the passage 90 from the distributing valve release pipe 88 is lapped by the rotary valve 92. The increase in brake pipe pressure shifts the equalizing piston 9 and slide valves 13 and 14 to release position as hereinbefore described, but due to the release pipe 87 being lapped in the automatic brake valve device 5, a release of the locomotive brakes does not occur or in other words, the locomotive brakes are held applied while the brakes on the cars of the train are being released by an increase in brake-pipe pressure. As hereinbefore described, the release pipe 88 and passage 105, and the application pipe 87 and passage 119 are charged with fluid from the brake cylinder in effecting an application of the brakes. Due to the release pipe being charged, the reduction in pressure in the application piston chamber 19 does not occur upon connecting said chamber to the release pipe 88 through the equalizing slide valve 13 in the release position. In other words, the locomotive brake cylinder pressure is held at the degree obtained in the application, until the release of fluid from the brake cylinder is intentionally effected by movement of the automatic brake valve device to the running position, as hereinbefore described.

After an automatic service application of the brakes is effected, if, instead of releasing the brakes on the train by supplying fluid under perssure to the brake pipe 11, it is desired to release the brakes on the locomotive independently of the brakes on the train, the independent brake valve device 4 is turned to release position.

In release position of the independent brake valve device, a cavity 151 in the rotary valve 82 connects the application pipe 87 with the atmospheric passage 134, and the pipe 87 being connected by passage 119 to chamber 118 fluid is vented from said chamber and from one side of the diaphragm 33 in the distributing valve device. The release pipe 88 is connected through a port 152 in the rotary valve 82 to chamber 81 which is supplied with fluid under pressure through pipe 85 from the reducing valve 86. The release pipe 88 being charged with fluid under pressure from the brake cylinder 108 in effecting a service application of the brakes as hereinbefore described, fluid under pressure flows from the reducing valve device to said pipe only if the pressure already in said pipe is less than the pressure of fluid supplied by the reducing valve device. If the pressure already in the release pipe 88 is not less than that supplied by the reducing valve device, fluid under pressure from the reducing valve device acts merely to maintain the pressure in said pipe.

Since the release pipe 88 communicates through passage 105 to chamber 115 in the distributing valve device, release pipe pressure acts on one side of the diaphragm 33. The pressure in chamber 118 at the opposite side of diaphragm 33 being reduced as above described, said diaphragm is deflected by the pressure in chamber 115 and the lever 37 is thereby operated to unseat the cut off valve 31.

Unseating of the cut-off valve 31 vents fluid under pressure from the application piston chamber 19 by way of passage 101, cut-off valve chamber 30, and past the cut-off valve 31 to chamber 118 which is open through the application pipe 87 to the atmosphere as above described. Venting of fluid from the application piston chamber 19 permits brake cylinder pressure in chamber 22 to operate said piston to effect a release of fluid under pressure from the brake cylinder 108.

The check valve 120 is provided to prevent flow of fluid under pressure from the release pipe passage 105 to the application pipe passage 119 through which fluid is vented in effecting an independent release of the locomotive brakes.

To apply the locomotive brakes independently of the train brakes, the independent brake valve device 4 is turned to application position in which a port 153 connects the rotary valve chamber 81 to the application pipe 87, so that fluid supplied from the reducing valve device 86 to chamber 81 flows to the application pipe 87 and thence flows through passage 119 to chamber 118 and acts on the cut-off valve 31. The cut-off valve is not connected to lever 37, so that the pressure of fluid acting on said valve unseats it against the opposing pressure of the light spring 32. Fluid under pressure supplied to chamber 118 then flows past said valve to chamber 30 and from thence through passage 101 to the application piston chamber 19. The piston 18 is thereby operated to supply fluid under pressure to the brake cylinder 108 as hereinbefore described.

In effecting an independent application of the brakes, the check valve 130 prevents flow of fluid from the application pipe 87 and passage 119 to passage 128 connecting to the brake cylinder 108, but the release pipe 88, passage 105 and chamber 115 are charged with fluid under pressure from the application pipe passage 119 by flow past the check valve 120 and also by flow from passage 101 through cavity 102 in the equalizing slide valve 13, passage 103 and past the check valve 104, so that the diaphragm 33 will be immediately responsive to a reduction in pressure in chamber 118 in effecting an independent release of the brakes as has been hereinbefore described. In effecting an independent release of the locomotive brakes, the check valve 104 prevents flow of fluid under pressure from the release pipe passage 105 to passage 103 which communicates through cavity 102 in the equalizing slide valve 13 with passage 101 from the application piston chamber 19, from which chamber fluid is vented to effect the release of brakes.

If desired, the locomotive brakes may also be released after an independent application of the brakes, by moving the independent brake valve device to running position, in which position the release pipe 88 is open to the atmosphere through the automatic brake valve device 5, and under this condition fluid is vented from the application piston chamber 19 through passage 101, cavity 102 in the equalizing slide valve 13, through passage 103, past the check valve 104, through passage 105 and then through the release pipe 88.

To effect an emergency application of the brakes, the automatic brake valve device 5 is operated to effect a sudden reduction in pressure in the brake pipe 11. The equalizing piston 9 and slide valves 13 and 14 are thereupon moved to emergency position in which fluid is supplied from the pressure chamber 17 to the application piston chamber 19 directly from valve chamber 15, past the end of the slide valve 13 to passage 101 leading to the piston chamber 19. Passage 123 from the application chamber 124 is lapped by the slide valve 13, so that fluid pressure equalizes from the pressure chamber 17 only into the application piston chamber 19. The application portion of the distributing valve device is then operated to supply fluid under pressure to the brake cylinder 108 at a pressure corresponding with the pressure at which the pressure chamber 17 equalizes into the piston chamber 19.

The application pipe 87, passage 119 and chamber 118 are charged with fluid under pressure from the brake cylinder 108, and the release pipe 88, passage 105 and chamber 115 are charged with fluid under pressure from passage 119 in the same manner as when a service application of the brakes is effected. From chamber 118, fluid under pressure flows through passage 135 to chamber 53 at one side of the double check valve 50. Chamber 51 at the opposite side of said check valve being open to brake pipe 11 through passages 112 and 12, fluid under pressure is vented from said chamber in effecting an emergency application of the brakes. When the pressure in chamber 53 exceeds the reduced pressure in chamber 51, the check valve 50 is moved so as to connect passage 113 to chamber 53. Fluid under pressure then flows from chamber 53 through passage 113 to diaphragm chamber 114 and acts on the diaphragm 44 to maintain said diaphragm deflected and valve 43 seated so as to permit release of the locomotive brakes independently of the train brakes, by operation of the independent brake valve device 4 in the manner hereinbefore described.

It will be noted that if the valve 43 were not retained seated in effecting an emergency application of the brakes, an independent release of the locomotive brakes could not be effected, for the reason that fluid under pressure supplied by the operation of the independent brake valve device 4 to chamber 115 for deflecting diaphragm 33 to unseat the cut-off valve 31, would be vented from said chamber to the atmosphere past valve 43, through chamber 116 and passage 117.

If the application pipe 87 is broken when an emergency application of the brakes is effected, the double check valve 50 will not be operated as above described, but fluid under pressure will be vented from diaphragm chamber 114. Under this condition an independent release of the brakes after an emergency application can not be effected for the reason that valve 43 is not held seated. If the application pipe 87 should break after having effected an emergency application of the brakes, fluid under pressure will be vented from chamber 118 and from diaphragm chamber 114 which is connected to chamber 118 through the double check valve device. The venting of fluid from chamber 114 permits release pipe pressure in diaphragm chamber 115 to unseat valve 43 and thus vent to the atmosphere. This venting of fluid from chamber 115 prevents diaphragm 33 from being deflected against the reduced pressure in chamber 118 and unseating the cut-off valve 31 which would cause an undesired release of the brakes.

If the application pipe 87 is or should become broken there will be leakage of fluid under pressure from the brake cylinder past the check valve 130 and through the application pipe 87 to the atmosphere, but such leakage is rendered inappreciable by the introduction of the choke passage 129 which restricts the leakage flow.

If the application pipe 87 should become broken after a service application of the brakes is effected, the locomotive brakes will release because the cut-off valve 31 will be opened by release pipe pressure in chamber 115 acting on diaphragm 33, the chamber 118 at the opposite side of the diaphragm 33 being vented through the broken application pipe 87. As hereinbefore described, the valve 43 is held seated when a service application of the brakes is effected by action of brake pipe pressure in chamber 114 on diaphragm 44, fluid under pressure being supplied to chamber 114 from the brake pipe 11 through passages 12 and 112, double check valve chamber 51 and through passage 113.

To prevent such an undesired release of the brakes, the operator effects a sudden reduction in brake pipe pressure to cause an emergency application of the brakes. As a result, fluid at brake pipe pressure is vented from diaphragm chamber 114 so as to permit release pipe pressure in chamber 115 to unseat valve 43 and to flow past said valve to the atmosphere. This causes the opposing pressures on the cut-off valve diaphragm 33 to become substantially balanced so that the fluid pressure in cut-off valve chamber 30 in addition to the pressure of spring 32 will seat the cut-off valve 31 and thus prevent venting of fluid under pressure from the application piston chamber 19. The pressure of fluid supplied to chamber 19 will then operate the application portion of the distributing valve device to apply the locomotive brakes in the manner hereinbefore described.

If the application pipe 87 should be broken before an application of the brakes is initiated, an emergency application of the brakes can be effected in the same manner as hereinbefore described. Also, a service application of the brakes can be effected if desired, since diaphragm chamber 115 will not be supplied with fluid under pressure from passage 119 for unseating the cut-off valve 31, on account of passage 119 being vented through the broken application pipe.

If the distributing valve release pipe 88 should be broken or become broken, fluid under pressure will leak from passage 119 and thus from the application pipe 87 through choked passage 131 to passage 105 connecting to the release pipe 88, but the leakage is so restricted by said choked passage 131 that there will be no appreciable loss of fluid pressure in effecting an independent application of the brakes. It will however be noted, that with the release pipe 88 broken, an independent release of the brakes cannot be effected, but the brakes may be released by an increase in brake pipe pressure as hereinbefore described.

While the train is running, and the brakes remain released, the engineer must maintain the pedal 76 depressed by the pressure of his foot.

If, while the brakes are released, the engineer should remove his foot from the pedal 76, as for instance due to his becoming incapacitated, then the spring 71 will act to seat the valve 79 and the diaphragm 74 will be moved away from the seat rib 75.

The seating of valve 74 cuts off the supply of fluid under pressure from chamber 70 to the application piston chamber 55, while the movement of diaphragm 74 permits venting of fluid under pressure from chamber 55 to the atmosphere through passage 98, past the diaphragm seat rib 60 to chamber 97 and from thence through passage and pipe 96, chamber 73 in the foot valve device, past the diaphragm 74 and to the atmosphere through chamber 78, which chamber is open to the atmosphere through passage 154.

The venting of fluid under pressure from the application piston chamber 55 permits main reservoir pressure in valve chamber 56 to move the application piston 54 and slide valve 57 to emergency application position in which the brake pipe 11 is opened to the atmosphere through passage 12, cavity 136 in said slide valve and atmospheric passage 137. Fluid under pressure is thereby suddenly vented directly from the brake pipe to the atmosphere and causes an emergency application of the brakes to be effected. Passage 99 is lapped by the slide valve 57 so as to cut off the supply of fluid to the reducing valve device 86 and from thence to the independent brake valve device 4 for reasons which will be hereinafter explained. Passage 109 from the brake cylinder 108 is disconnected from passage 127 so that fluid under pressure is not supplied from the brake cylinder to the application pipe 87 or release pipe 88 as in effecting an application of the brakes by operation of the brake valve device 5. This is desirable, since with the supply of fluid under pressure cut off from the rotary valve chamber 81 of the independent brake valve device, if fluid under pressure were supplied to the application pipe and release pipe 88, the pressure in said pipes acting on the seating face of rotary valve 82 might lift said rotary valve and permit fluid under pressure to be vented from said pipes to the atmosphere through passage 134, and the flow of fluid between the rotary valve and its seat might carry dirt or other foreign material on to the seat which would later prevent proper operation of the rotary valve.

With the application slide valve 57 in emergency position, diaphragm chamber 66 is connected to the atmosphere through passages 133 and 127, port 138 in said slide valve and atmospheric passage 139. This ensures seat rib 60 of diaphragm 59 remaining out of engagement with the casing rib 61, so that a release of brakes can be effected in the following manner.

To release the brakes after an emergency application caused by operation of the foot valve device 3, the pedal 76 is depressed to deflect diaphragm 74 into engagement with seat rib 75 and to unseat valve 69. This permits fluid under pressure to flow to pipe 96 and from thence through the diaphragm cutoff valve chamber 97 and passage 98 to the application piston chamber 55.

The application piston 54 and slide valve 57 are thereby moved to release position, in which fluid under pressure is again supplied to the independent brake valve device 4, which may then be operated in the manner hereinbefore described to effect a release of the brakes.

It will be noted that if the seat rib 60 on diaphragm 59 were not maintained away from the casing seat 61 by opening the diaphragm chamber 66 to the atmosphere, it would be impossible to supply fluid to the application piston chamber 55 to effect a release of the brakes.

When an application of the brakes is effected by operation of either the automatic brake valve device 5 or independent brake valve device 4 in the manner hereinbefore described, fluid under pressure is supplied to the diaphragm chamber 66 by flow from the brake cylinder passage 109 through cavity 126 in the application slide valve 57 and passages 127 and 133. When the pressure in chamber 66 is increased sufficiently to deflect diaphragm 62, the diaphragm valve 59 will be shifted by movement of the diaphragm 62 so that the seat rib 60 will engage the seat 61. Connection from pipe 96 to passage 98 is thus cut off, so that the operator may remove his foot from pedal 76, after having effected a predetermined application of the brakes, without causing the application valve device 2 to operate. However, before the brakes are released after an application, the pedal 76 must be again depressed, to that when diaphragm 59 deflects and moves seat rib 60 away from rib 61 upon the relief of fluid pressure in diaphragm chamber 66, an undesired emergency application of the brakes will not be effected.

From the foregoing description of the operation of the improved brake equipment it will be noted that by providing the double check valve 50 to connect chamber 118 to diaphragm chamber 114 in effecting an emergency application of the brakes, it is possible for the operator to effect an independent release of the locomotive brakes even though the brake pipe is vented. It is apparent however, that the brakes can not be released unless the operator maintains the foot valve device 6 in a depressed position for the reason that the distributing valve device control by the independent brake valve device 4 is interlocked through the application valve device 2 in such a manner that maximum safety of control is provided, due to the fact that if the operator should for any reason remove pressure from pedal 76 of the foot valve device, an emergency application of the brakes will be automatically effected, which application can in no way be released until the foot pedal is again depressed to its normal position.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake cylinder, of a valve device for supplying fluid under pressure to said brake cylinder and for releasing fluid under pressure from said brake cylinder, a pipe for supplying fluid under pressure to said valve device, a check valve for normally preventing back flow through said pipe, an abutment movable by fluid under pressure for unseating said check valve for permitting release of fluid under pressure from said valve device through said pipe, a release pipe for supplying fluid under pressure to said abutment, a valve for venting fluid under pressure from said release pipe, a brake pipe, a movable abutment operated by fluid under pressure from said brake pipe for seating said valve, and means operated upon a reduction in brake pipe pressure to supply fluid under pressure from the first mentioned pipe to said movable abutment.

2. In a fluid pressure brake, the combination with a brake cylinder, of a valve device for supplying fluid under pressure to said brake cylinder and for releasing fluid under pressure from said brake cylinder, a pipe for supplying fluid under pressure to said valve device, a check valve for normally preventing back flow through said pipe, an abutment movable by fluid under pressure for unseating said check valve for permitting release of fluid under pressure from said valve device through said pipe, a release pipe for supplying fluid under pressure to said abutment, a brake pipe, a valve for venting fluid under pressure from said release pipe and normally maintained seated by fluid under pressure from said brake pipe, and valve means operated upon a reduction in brake pipe pressure to supply fluid under pressure from the first mentioned pipe to maintain said valve seated.

3. In a fluid pressure brake, the combination with a brake pipe and a brake cylinder, of a valve device operative upon an increase in fluid pressure to supply fluid under pressure to said brake cylinder and upon a reduction in fluid pressure to vent fluid under pressure from said brake cylinder, valve means operated by variations in brake pipe pressure for controlling the operation of said valve device, means operated by fluid under pressure for venting fluid under pressure from said valve device independently of said valve means, a brake valve device for supplying fluid under pressure to said means, and safety control means operative upon the relief of manual pressure for venting fluid under pressure from said brake pipe and for cutting off the supply of fluid under pressure to said brake valve device.

4. In a fluid pressure brake, the combination with a brake pipe and a brake cylinder, of a valve device operative upon an increase in fluid pressure to supply fluid under pressure to said brake cylinder and upon a reduction in fluid pressure to vent fluid under pressure from said brake cylinder, valve means operated by variations in brake pipe pressure for controlling the operation of said valve device, means operated by fluid under pressure for venting fluid under pressure from said valve device independently of said valve means, a brake valve device for supplying fluid under pressure to said means, and safety control means normally subject to manual pressure for supplying fluid under pressure to said brake valve device and operative upon the relief of manual pressure for cutting off the supply of fluid under pressure to said brake valve device.

5. In a fluid pressure brake, the combination with a brake pipe and a brake cylinder, of a valve device operative upon an increase in fluid pressure to supply fluid under pressure to said brake cylinder and upon a reduction in fluid pressure to vent fluid under pressure from said brake cylinder, valve means operated by variations in brake pipe pressure for controlling the operation of said valve device, means operated by fluid under pressure for venting fluid under pressure from said valve device independently of said valve means, a brake valve device for supplying fluid under pressure to said means, a safety control application valve device operative upon a reduction in fluid pressure to vent fluid under pressure from said brake pipe and to cut off the supply of fluid under pressure to said brake valve device, a manually controlled device operative upon the relief of manual pressure for reducing the fluid pressure on said safety control application valve device, and means operative by a predetermined increase in brake cylinder pressure for preventing the operation of said safety control application valve device upon the relief of manual pressure on said manually controlled device.

6. In a fluid pressure brake, the combination with a brake pipe and a brake cylinder, of an application valve device operated upon an increase in fluid pressure to effect an application of the brakes and upon a reduction in fluid pressure to effect a release of the brakes, an equalizing valve device operative upon a reduction in brake pipe pressure to supply fluid under pressure to said application valve device, a pipe for releasing fluid under pressure from said application valve device, a check valve for normally preventing flow of fluid from said application valve device to said pipe, means operated by fluid pressure for unseating said check valve, a release pipe for supplying fluid under pressure to said means, means for supplying fluid under pressure to both of said pipes from said brake cylinder, a check valve for preventing back flow from said pipes to said brake cylinder, a brake valve device for connecting the first mentioned pipe to the atmosphere and for supplying fluid under pressure to the release pipe, safety control means for controlling the supply of fluid from the brake cylinder to both of said pipes and the supply of fluid to said brake valve device, and operative upon a reduction in pressure to cut off the supply of fluid to said pipes and to said brake valve device and to vent fluid under pressure from said brake pipe to the atmosphere, and manually controlled means operated upon the relief of manual pressure by the operator for reducing the pressure of fluid on said safety control means.

7. In a fluid pressure brake, the combination with a valve device having an application piston chamber and operated by variations in fluid pressure in said chamber for controlling the brakes, an application pipe for supplying fluid under pressure to said piston chamber, a check valve for normally preventing back flow of fluid under pressure from said piston chamber to said application pipe, a release pipe connected to and supplied with fluid under pressure from said application pipe, a check valve for preventing back flow of fluid under pressure from said release pipe to said application pipe, means operated upon an increase in fluid pressure in said release pipe over the pressure in said application pipe for opening the check valve to release fluid under pressure from said piston chamber through said application pipe, and a brake valve device for supplying fluid under pressure to said release pipe and for opening said application pipe to the atmosphere.

8. In a fluid pressure brake, the combination with a brake cylinder, of an application valve device operative in accordance with variations in fluid pressure to supply fluid under pressure to said brake cylinder and to vent fluid under pressure from said brake cylinder, an application pipe for supplying fluid under pressure to said application valve device and communicating with said brake cylinder, means for preventing flow of fluid from said application pipe to said brake cylinder, a release pipe for releasing fluid under pressure from said application valve device and communicating with said application pipe, means for preventing flow of fluid from the release pipe to the application pipe, and valve means for supplying fluid under pressure to said application valve device.

9. In a fluid pressure brake, the combination with a brake pipe and a brake cylinder, of an application valve device operative in accordance with variations in fluid pressure to supply fluid under pressure to said brake cylinder and to release fluid under pressure from said brake cylinder, an equalizing valve device having a release position for venting fluid under pressure from said application valve device and movable upon a reduction in brake pipe pressure to an application position for supplying fluid under pressure to said application valve device, an application pipe for supplying fluid under pressure to said appliaction valve device independently of said equalizing valve device and communicating with said brake cylinder, valve means for preventing flow of fluid under pressure from said application pipe to said brake cylinder, a release pipe through which fluid is vented from said application valve device when said equalizing valve device is in release position, said release pipe communicating with said application pipe, valve means for preventing flow of fluid from the release pipe to the application pipe, and cut-off valve means operative in accordance with the pressures in the application pipe and release pipe for controlling communication from the application valve device to the application pipe.

10. In a fluid pressure brake, the combination with a brake cylinder, of a valve device operated by variations in fluid pressure for controlling the supply of fluid under pressure to said brake cylinder and having a passage through which fluid under pressure is supplied to said valve device, a check valve for preventing back flow from said valve device through said passage, a lever having an arm for unseating said check valve, and a movable abutment operated by fluid under pressure for operating said lever to unseat said check valve for releasing fluid under pressure from said valve device through said passage upon releasing the brakes.

11. In a fluid pressure brake, the combination with a brake cylinder, of a valve device operated by variations in fluid pressure for controlling the supply of fluid under pressure to said brake cylinder and having a passage through which fluid under pressure is supplied to said valve device, a check valve for preventing back flow from said valve device through said passage, a spring for seating said check valve, a lever for unseating said check valve to permit flow of fluid under pressure from said valve device through said passage in releasing the brakes, a movable abutment for operating said lever to unseat said check valve, and means operated in releasing the brakes for supplying fluid under pressure to said abutment.

12. In a fluid pressure brake, the combination with a brake cylinder, of an application valve device for supplying fluid under pressure to said brake cylinder and for releasing fluid under pressure from said brake cylinder, a pipe for supplying fluid under pressure to said application valve device, a check valve for normally preventing back flow through said pipe, an abutment movable by fluid under pressure for unseating said check valve for permitting release of fluid under pressure from said application valve device through said pipe, a release pipe for supplying fluid under pressure to said abutment, a valve for venting fluid under pressure from said release pipe, a lever, and a movable abutment operated by fluid under pressure to seat said valve through the medium of said lever.

In testimony whereof, I have hereunto set my hand, this 1st day of July, 1931.

JOSEPH C. McCUNE.